United States Patent
Pratt

(10) Patent No.: US 6,865,316 B1
(45) Date of Patent: Mar. 8, 2005

(54) SYSTEM AND METHOD OF OPERATING LOW COUPLING EFFICIENCY OPTICAL SOURCE BY DISSIPATING CLADDING MODES

(75) Inventor: Mark R. Pratt, Seattle, WA (US)

(73) Assignee: nLight Photonics Corporation, Vancouver, WA (US)

( * ) Notice: Subject to any disclaimer, the term of this patent is extended or adjusted under 35 U.S.C. 154(b) by 218 days.

(21) Appl. No.: 10/278,641

(22) Filed: Oct. 23, 2002

(51) Int. Cl.[7] .............................. G02B 6/26; G02B 6/42
(52) U.S. Cl. .............................. 385/29; 385/27; 385/28
(58) Field of Search .......................... 385/26–29, 123, 385/31

(56) References Cited

U.S. PATENT DOCUMENTS

| | | | | |
|---|---|---|---|---|
| 4,342,907 A | * | 8/1982 | Macedo et al. | 250/227.14 |
| 4,887,879 A | * | 12/1989 | Prucnal et al. | 385/48 |
| 6,052,394 A | | 4/2000 | Lee et al. | |
| 6,192,062 B1 | | 2/2001 | Sanchez-Rubio et al. | |
| 6,208,679 B1 | | 3/2001 | Sanchez-Rubio et al. | |
| 6,477,295 B1 | * | 11/2002 | Lang et al. | 385/31 |
| 6,636,675 B2 | * | 10/2003 | Soufiane | 385/123 |

OTHER PUBLICATIONS

U.S. Appl. No. 09/945,381, filed Aug. 31, 2001, Farmer et al.

* cited by examiner

Primary Examiner—Diane I. Lee
Assistant Examiner—Lisa M. Caputo
(74) Attorney, Agent, or Firm—Fulbright & Jaworski LLP

(57) ABSTRACT

An embodiment is directed to a system for dissipating cladding modes of an optical fiber. In the system, a high power light source couples optical power into the optical fiber at a fiber coupling point thereby producing the cladding modes; material is indexed-matched to the optical fiber and is optically contacted to the optical fiber near the fiber coupling point; and a substrate layer is operable to provide a thermal sink for heat generated from dissipation of cladding modes of the optical fiber.

21 Claims, 1 Drawing Sheet

SYSTEM AND METHOD OF OPERATING LOW COUPLING EFFICIENCY OPTICAL SOURCE BY DISSIPATING CLADDING MODES

TECHNICAL FIELD

The present invention is related to operation of fiber optical devices and, more particularly, to operation of low coupling efficiency devices by dissipating cladding modes.

BACKGROUND OF THE INVENTION

Incoherently beam combined (IBC) lasers combine the output from an array of gain elements or emitters (typically consisting of semiconductor material, such as GaAlAs, InP, GaAs, InGaAs, InGaAsP, AlGaInAs, and/or the like, which is capable of lasing at particular wavelengths) into a single output beam that may be coupled into, for example, an optical fiber. The gain elements may be discrete devices or may be included on an integrated device. Due to the geometry of IBC lasers, each gain element tends to lase at a unique wavelength. Exemplary arrangements of IBC lasers are described in U.S. Pat. No. 6,052,394 and U.S. Pat. No. 6,192,062.

FIG. 1 depicts a prior art arrangement of components in IBC laser 10. IBC laser 10 includes emitters 12-1 through 12-N which are disposed in a substantially linear configuration that is perpendicular to the optical axis of collimator 15 (e.g., a lens). Collimator 15 causes the plurality of beams produced by emitters 12-1 through 12-N to be substantially collimated and spatially overlapped on a single spot on diffraction grating 16. Additionally, collimator 15 directs feedback from partially reflective component 17 via diffraction grating 16 to emitters 12-1 through 12-N.

Diffraction grating 16 is disposed from collimator 15 at a distance approximately equal to the focal length of collimator 15. Furthermore, diffraction grating 16 is oriented to cause the output beams from emitters 12-1 through 12-N to be diffracted on the first order toward partially reflective component 17. Partially reflective component 17 causes a portion of optical energy to be reflected. The reflected optical energy is redirected by diffraction grating 16 and collimator 15 to the respective emitters 12-1 through 12-N. Diffraction grating 16 angularly separates the reflected optical beams causing the same wavelengths generated by each emitter 12-1 through 12-N to return to each respective emitter 12-1 through 12-N thereby locking each emitter at a unique wavelength. The grating effectively multiplexes the light from the array of emitters 12-1 through 12-N. Also, diffraction grating 16 is operable to demultiplex the reflected beams from partially reflective component 17.

It shall be appreciated that the geometry of external cavity 13 of IBC laser 10 defines the resonant wavelengths of emitters 12-1 through 12-N. The center wavelength ($\lambda_i$) of the wavelengths fed back to the $i^{th}$ emitter 12-i is given by the following equation: $\lambda_i = A[\sin(\alpha_i) + \sin(\beta)]$. In this equation, A is the spacing between rulings on diffraction grating 16, $\alpha_i$ is the angle of incidence of the light from the $i^{th}$ emitter on diffraction grating 16, and $\beta$ is the output angle which is common to all emitters 12-1 through 12-N. As examples, similar types of laser configurations are also discussed in U.S. Pat. No. 6,208,679.

Accordingly, the output of IBC laser 10 comprises the optical power transmitted by reflective component 17 consisting of wavelength components $\lambda_i$(i=0 to N). The transmitted optical power may be coupled into, for example, optical fiber 18.

BRIEF SUMMARY OF THE INVENTION

Embodiments of the present invention are directed to systems and methods for operating an IBC laser. It shall be appreciated that newly developed IBC laser systems such as the systems described in commonly assigned and co-pending U.S. patent application Ser. No. 09/945,381, entitled "SYSTEM AND METHOD FOR PROVIDING A SPECTRALLY TAILORED RAMAN PUMP," generate an appreciably high amount of optical power that may be coupled into an optical fiber. Moreover, the coupling efficiency of IBC lasers may be relatively low as compared to typical telecom lasers, because of the dispersive nature of the external cavity of the IBC lasers. Specifically, each respective emitter of the IBC laser may lase at more than one Fabry-Perot mode. When an emitter lases at different modes, the exit angle of those modes from the diffraction grating is slightly different. Accordingly, the modes are not perfectly colinear and a portion of the optical power may not be coupled into the core of an output fiber. Due to the coupling efficiency and high output power, several hundred milliwatts of power may be coupled into the cladding modes of the optical fiber. Coupling this amount of power into the cladding modes may cause significant increases in temperature when the power escapes the cladding. The attendant rise in temperature may adversely affect device reliability.

Accordingly, embodiments of the present invention extract and dissipate optical power associated the cladding modes in a controlled manner. Specifically, embodiments of the present invention may optically contact index-matched material to the optical fiber near the fiber coupling point of an IBC laser. By index-matching, reflections at the interface of the optical fiber and the index-matched material will be minimized. The index-matched material may advantageously extend a sufficient distance along the optical fiber to permit the cladding modes to escape the optical fiber into the indexed-matched material. Furthermore, embodiments of the present invention may attenuate the optical power associated with the cladding modes. In embodiments of the present invention, the optical characteristics of the index-matched material may be selected such that the indexed-matched material attenuates the wavelengths generated by the IBC laser. Additionally or alternatively, the extracted optical power may be attenuated through multiple internal reflections at lossy interfaces. Embodiments of the present invention may further utilize a thermally conducting structure or substrate to provide a suitable thermal path to dissipate the generated heat in a manner that reduces thermal effects on the respective device or system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 2:
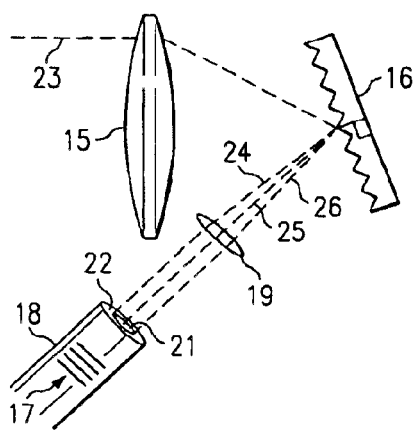
FIG. 2 depicts a single beam processed by an incoherently beam combined laser according to the prior art.

Before discussing the present invention in greater detail, it is appropriate to discuss the physical characteristics of IBC laser technology that may become problematic when relatively higher output powers are utilized. FIG. 2 depicts a portion of an IBC laser. It shall be appreciated that FIG. 2 is not drawn to scale or drawn according to an actual geometry for the purpose of illustrating the respective elements conveniently for the reader. The IBC laser generates beam 23 from one of its emitters 12-1 through 12-N (which are not shown in FIG. 2). Beam 23 may comprise several closely spaced Fabry-Perot modes. Accordingly, beam 23 does not consist of essentially one wavelength. It shall be appreciated that the IBC laser also simultaneously produces multi-mode beams from the other emitters. However, these beams are not shown in FIG. 2 to simplify the illustration for the present discussion.

Beam 23 is collimated and steered by collimator 15. When beam 23 is incident on diffraction grating 16, a degree of angular separation of the Fabry-Perot modes occurs. Specifically, the exit angles of Fabry-Perot modes 24, 25, and 26 are slightly different. Fabry-Perot modes 24, 25, and 26 may then be coupled into optical fiber by fiber coupling lens 19. Due to the different exit angles, Fabry-Perot mode 25 may be coupled into core 21 of optical fiber 18 while at least a portion of both Fabry-Perot modes 24 and 26 is coupled in to cladding 22. Additionally, it is noted that partially reflective component 17 is implemented as a fiber Bragg grating in FIG. 2.

It shall be appreciated that optical fiber 18 acts as a waveguide due to the refractive indices of core 21 and cladding 22. Specifically, core 21 (FIG. 2) may possess an index of refraction of $n_1$ and cladding 22 may possess an index of refraction of $n_2$ such that $n_2<n_1$. Optical power coupled into core 21 with the appropriate numerical aperture is subject to total internal reflection and, hence, propagates without appreciable loss in optical fiber 18. Additionally, it shall be appreciated that $n_0<n_1$ wherein no is the approximate refractive index of air or a suitable butter material (not shown). Accordingly, cladding modes (optical power coupled into cladding 22 of optical fiber 18) experience waveguiding and are subject to total internal reflection if the cladding modes are associated with an appropriate numerical aperture. As the cladding modes are normally confined to optical fiber 18 by total internal reflection at the air-glass interface, the cladding modes may propagate some amount of distance before escaping cladding 22 of optical fiber 18.

Additionally, upon escape from optical fiber 18, the cladding modes may be inadvertently incident on a portion of a device that is not designed to dissipate the thermal power generated by the cladding modes. Accordingly, operating the IBC laser at a relatively higher power (e.g., sufficiently high to generate Raman gain over a suitable band or bands) may adversely affect device reliability.

Figure 1:
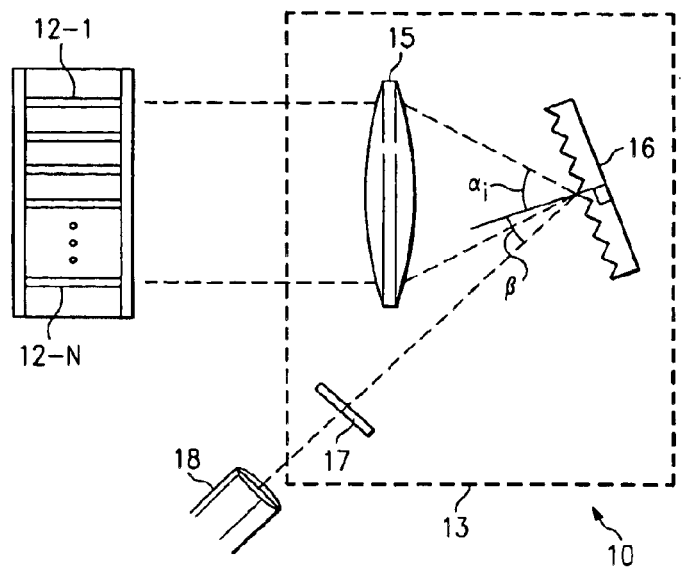
FIG. 1 depict an incoherently beam combined laser according to the prior art.
Figure 3:
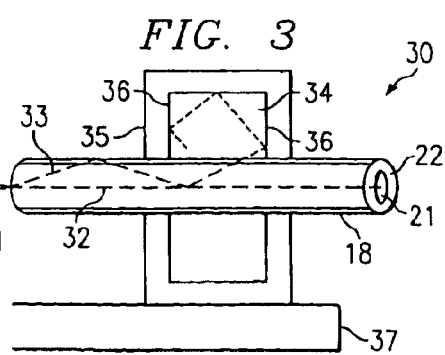
FIG. 3 depicts a system for dissipating cladding modes of a laser according to embodiments of the present invention.

Accordingly, embodiments of the present invention advantageously dissipate the cladding modes in a manner that prevents the generated thermal power from causing an undesirable effect. FIG. 3 depicts a cross-section view of system 30 that dissipates cladding modes 33 according to embodiments of the present invention. System 30 comprises laser 39 that generates single or multimode beam 31. Beam 31 is coupled into optical fiber 18. Laser 39 may be implemented according to IBC laser 10 shown in FIG. 1. Alternatively, laser 39 may be implemented according to the IBC laser shown in FIG. 2 where the beam is coupled in optical fiber 21 and feedback is provided from the optical fiber via a partially reflective fiber Bragg grating. It shall be appreciated that the present invention is not limited to any particular laser design. Embodiments of the present invention may operate with any suitable optical source that generates cladding modes associated with an undesirable amount of power. A portion of beam 31 may propagate as single mode 32 in core 21 of optical fiber 18. Additionally, a portion of beam 31 may propagate as cladding mode 33 in cladding 22 of optical fiber 18.

System 30 comprises mount 35 that at least partially surrounds optical fiber 18 preferably near the fiber coupling point. Mount 35 may be implemented as a metal frame that surrounds material 34 (e.g., glass). Material 34 is optically contacted and indexed-matched to cladding 22 to minimize or reduce the reflections at the optical interface of material 34 and cladding 22. Accordingly, cladding mode 33 is not subject to total internal reflection at the optical interface between material 34 and cladding 22 and, hence, cladding mode 33 escapes optical fiber 18 at the interface. In embodiments of the present invention, material 34 extends at least 5 mm along optical fiber to permit substantially all of the optical power associated with cladding mode 33 to escape.

Cladding mode 33 may be attenuated by selecting material 34 to attenuate the wavelengths generated by laser 39. For example, material 34 may be implemented using filter glass. The amount of attenuation of material 34 may be advantageously selected such that substantially all of the attenuation does not occur near the optical interface. Instead, several internal reflections within mount 34 may advantageously occur. In this manner, the thermal power generated by attenuation of cladding mode 33 may be more efficiently conducted by mount 35 and substrate 37 to prevent an appreciably increased temperature of optical fiber 18. Additionally or alternatively, the absorption of cladding mode 33 may occur at lossy interfaces 36. Specifically, a portion of the optical power may be absorbed upon each reflection from one of lossy interfaces 36. Although all of the power may not be absorbed upon one reflection, most of the optical power may be absorbed after several reflections. Absorption at lossy interfaces 36 may be utilized if it is desired to utilize a transparent (non-absorbing) substance for material 34.

Mount 34 may be implemented utilizing a suitable material (e.g., metal) that possesses relatively high thermal conductivity. Mount 35 may also be advantageously thermally coupled to a heat sink (e.g., substrate 37). Accordingly, in embodiments of the present invention, material 34 is thermally coupled to substrate 37 and is also thermally coupled to material 34 thereby providing a thermally conductive path to dissipate the heat generated by dissipation of cladding mode 33.

It shall be appreciated that embodiments of the present invention provide advantages over known laser technology. Specifically, the output beams of known telecom lasers are typically associated with relatively high coupling efficiencies. Accordingly, active dissipation of cladding modes generated by coupling output beams of known telecom lasers is not necessary, because convection and radiation will dissipate any generated heat without appreciably affecting related devices. Moreover, most known telecom lasers operate at relatively low powers and, hence, even if their coupling efficiencies were relatively low, minimal effects would result from uncontrolled dissipation of the cladding modes. Embodiments of the present invention enable high power lasers (e.g., IBC lasers) to be utilized in telecommunication systems without adversely affecting related devices. In particular, embodiments of the present invention enable dissipation of hundreds of milliwatts of optical power associated with cladding modes before the optical power can damage related devices or cause other undesirable effects.

Although embodiments of the present invention have been described as dissipating cladding modes associated with an IBC laser, the present invention is not so limited. Embodiments of the present invention may dissipate cladding modes generated by a suitable optical source that couples an amount of optical power into the cladding modes of an optical fiber sufficient to cause undesirable effects in related components. For example, embodiments of the present invention may dissipate the cladding modes associated with single mode fiber coupling of poor beam quality high power lasers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for dissipating cladding modes of an optical fiber, comprising:
   a high power light source that couples optical power into said optical fiber at a fiber coupling point thereby producing said cladding modes;
   material that is indexed-matched to said optical fiber and is optically contacted to said optical fiber near said fiber coupling point; and
   a substrate layer that is operable to provide a thermal sink for heat generated from dissipation of cladding modes that escape said optical fiber.

2. The system of claim 1 wherein transmission characteristics of said indexed-material at least partially attenuate said cladding modes.

3. The system of claim 1 wherein said indexed-matched material is filter glass.

4. The system of claim 1 further comprising:
   a thermally conductive mount that at least partially surrounds said index-matched material and is thermally coupled to said index-matched material and said substrate layer.

5. The system of claim 4 wherein said thermally conductive material provides a lossy interface for attenuating said cladding modes.

6. The system of claim 1 wherein said cladding modes possess optical power that is greater than 100 mW.

7. The system of claim 1 wherein said indexed-matched material extends a distance of at least 5 mm along said optical fiber.

8. A method for operating an incoherently beam combined (IBC) laser, comprising:
   operating a plurality of gain elements wherein each of said gain elements emits a multimode beam;
   diffracting said multimode beams emitted by said plurality of emitters to produce first order diffraction beams;
   coupling said first order diffraction beams into an optical fiber, wherein a portion of said first order diffraction beams are coupled in said optical fiber as cladding modes;
   suppressing total internal reflection of said cladding modes near a fiber coupling point of said IBC laser to permit said cladding modes to escape said optical fiber; and
   attenuating said cladding modes after escape from said optical fiber.

9. The method of claim 8 wherein said suppressing total internal reflection is performed by optically contacting index-matched material to said optical fiber.

10. The method of claim 9 wherein said index-matched material extends a distance of at least 5 mm along said optical fiber.

11. The method of claim 8 wherein said attenuating is performed by filter glass.

12. The method of claim 8 wherein said attenuating comprises:
    causing multiple reflections at lossy interfaces.

13. The method of claim 8 further comprising:
    thermally conducting heat generated by attenuation of said cladding modes to a heat sink.

14. The method of claim 8 wherein said cladding modes possess optical power that is greater than 100 mW.

15. A system for dissipating cladding modes of an optical fiber, comprising:
    an incoherently beam combined (IBC) laser that couples optical power into said optical fiber as said cladding modes;
    material that is indexed-matched to an optical fiber of said IBC laser and is optically contacted to said optical fiber near a fiber-coupling point of said IBC laser; and
    a substrate layer that is operable to provide a thermal sink for heat generated from dissipation of cladding modes that escape said optical fiber.

16. The system of claim 15 wherein transmission characteristics of said indexed-material at least partially attenuate said cladding modes.

17. The system of claim 15 wherein said indexed-matched material is filter glass.

18. The system of claim 15 further comprising:
    a thermally conductive mount that at least partially surrounds said index-matched material and is thermally coupled to said index-matched material and said substrate layer.

19. The system of claim 18 wherein said thermally conductive material provides a lossy interface for attenuating said cladding modes.

20. The system of claim 15 wherein said cladding modes possess optical power that is greater than 100 mW.

21. The system of claim 15 wherein said indexed-matched material extends a distance of at least 5 mm along said optical fiber.

* * * * *